(12) United States Patent
Ott et al.

(10) Patent No.: US 10,865,467 B2
(45) Date of Patent: Dec. 15, 2020

(54) MOLYBDENUM-SILICON-BORON ALLOY AND METHOD FOR PRODUCING SAME, AND COMPONENT

(71) Applicant: Siemens Aktiengesellschaft, Munich (DE)

(72) Inventors: Michael Ott, Mülheim an der Ruhr (DE); Sebastian Piegert, Lübbenau (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 271 days.

(21) Appl. No.: 15/573,398

(22) PCT Filed: Apr. 27, 2016

(86) PCT No.: PCT/EP2016/059342
§ 371 (c)(1),
(2) Date: Nov. 10, 2017

(87) PCT Pub. No.: WO2016/188696
PCT Pub. Date: Dec. 1, 2016

(65) Prior Publication Data
US 2018/0135153 A1 May 17, 2018

(30) Foreign Application Priority Data
May 26, 2015 (DE) .......... 10 2015 209 583

(51) Int. Cl.
*C22C 27/04* (2006.01)
*B22F 3/105* (2006.01)
*C22C 1/04* (2006.01)

(52) U.S. Cl.
CPC ............ *C22C 27/04* (2013.01); *B22F 3/1055* (2013.01); *C22C 1/045* (2013.01)

(58) Field of Classification Search
CPC .............................. C22C 27/04; B22F 3/1055
USPC ........................................................... 419/7
See application file for complete search history.

(56) References Cited

U.S. PATENT DOCUMENTS

| 5,595,616 | A  | 1/1997  | Berczik          |
|-----------|----|---------|------------------|
| 5,693,156 | A  | 12/1997 | Berczik          |
| 2006/0169369 | A1 | 8/2006 | Jehanno          |
| 2008/0128472 | A1 | 6/2008 | Park et al.     |
| 2009/0291312 | A1 | 11/2009 | Perepezko et al. |
| 2014/0302305 | A1 | 10/2014 | Mukherjee et al. |
| 2014/0373681 | A1 | 12/2014 | Yamazaki et al.  |
| 2015/0056408 | A1 | 2/2015 | Kadokura et al.  |
| 2015/0086408 | A1 | 3/2015 | Kottilingam et al. |

FOREIGN PATENT DOCUMENTS

| DE | 69620998 T2 | 12/2002 |
|----|-------------|---------|
| EP | 1664362 B1  | 2/2012  |
| JP | 2014012883 A | 1/2014 |
| JP | 2015067902 A | 4/2015 |
| WO | 2014112151 A1 | 7/2014 |

OTHER PUBLICATIONS

Schneibel et al.; "Optimization of Mo—Si—B Intermetallic Alloys"; Metallurgical and Materials Transaction A; Band 36A; pp. 525-531; 2005. (Year: 2005).*
Schneibel, J.H. et al; "Optimization of Mo—Si—B Intermetallic alloys"; Metallurgical and materials transaction A; Band 36A; pp. 525-531; 2005.
DE Search Report dated Feb. 12, 2016, for DE patent application No. 102015209583.5.
International Search Report dated Jul. 13, 2016, for PCT/EP2016/059342.
Wang, F et al, "Microstructure and oxidation resistance of laser-remelted Mo—Si—B alloy"; Acta Materialia Inc, Elsevier Ltd, vol. 56; No. 9; 2007, pp. 737-740, XP005905543; ISSN: 1359-6462, URL: http://www.actamat-journals.com, Amsterdam NL.
Krüger M et al, "Influence of processing on the microstructure and mechanical behaviour of Mo—Si—B alloys", Journal of Physics: Conference Series 240 (2010) 012087, Institute of Physics Publishing, vol. 240, No. 1, 2010, 4 pgs, XP020195090; ISSN: 1742-6596, DOI: 10.1088/1742-6596/240/1/012087, Bristol GB.
Gorr B et al, "High-temperature oxidation behavior of Mo—Si—B-based and Co—Re—Cr-based alloys"; Intermetallics, Elsevier Ltd, vol. 48, 2014, pp. 34-43, XP028668032; ISSN: 0966-9795, DOI: 10.1016/J.INTERMET.2013.10.008, GB.
Hasemann G et al, "Microstructure and creep properties of a near-eutectic directionally solidified multiphase Mo—Si—B alloy", Intermetallics, Elsevier Ltd, vol. 48, 2014, pp. 28-33, XP028668038; ISSN: 0966-9795, DOI:10.1016/J.INTERMET.2013.11.022, GB.
Paswan S et al, "Isothermal oxidation behaviour of Mo—Si-Band Mo—Si—B—Al alloys in the temperature range of 400-800<o>C", Materials Science & Engineering A: Structural Materials: Properties, Microstructures and Processing, Elsevier B V, vol. 424, No. 1-2, 2006, pp. 251-265, XP027952589; ISSN: 0921-5093, NL.
Yang Ying et al: "Effects of Ti, Zr, and Hf on the phase stability of Mo_ss + Mo3Si + Mo5SiB2 alloys at 1600° C."; Acta Materialia; vol. 58, pp. 541-548; Elsevier; 2010.
Kruger, M. et al: "Influence of Processing on the Microstructure and Mechanical Properties of Mo—Si—B Alloys"; 17th Plansee Seminar 2009, vol. 48, pp. 34-43; 2009.

* cited by examiner

*Primary Examiner* — Weiping Zhu

(57) ABSTRACT

The use of a specific molybdenum-silicon-boron alloy and a particular production process in which powder is used makes it possible to achieve components which have a particular fiber-matrix structure and can be used for high-temperature applications and can also be produced inexpensively.

15 Claims, No Drawings

MOLYBDENUM-SILICON-BORON ALLOY AND METHOD FOR PRODUCING SAME, AND COMPONENT

CROSS REFERENCE TO RELATED APPLICATIONS

This application is the US National Stage of International Application No. PCT/EP2016/059342 filed Apr. 27, 2016, and claims the benefit thereof. The International Application claims the benefit of German Application No. DE 102015209583.5 filed May 26, 2015. All of the applications are incorporated by reference herein in their entirety.

FIELD OF INVENTION

The invention relates to a specific molybdenum-silicon-boron alloy, a production process and a component.

BACKGROUND OF INVENTION

Mo-(x)Si-(y)B alloys represent a potential opportunity for making hot gas components for a gas turbine which go beyond the use window of classical nickel-based superalloys. These alloys offer a use window up to a hot gas temperature of 1973K, with a coating up to 2073K. Widening of the use range by up to 300K, associated with a corresponding increase in the efficiency, compared to alloys used hitherto is thus possible.

The processing of these alloys can be carried out by a powder-metallurgical route, or else by means of zone melting. Zone melting leads, because of the temperature gradient which arises, to formation of a fiber-matrix structure which is impressive due to its excellent creep properties at temperatures above 1273K.

However, both processes allow only formation of simple test specimens, so that the potential of these alloys cannot be exploited at present.

SUMMARY OF INVENTION

It is therefore an object of the invention to solve the abovementioned problem.

The object is achieved by an alloy, a process and a component as claimed.

It is proposed that a novel Mo—Si—B alloy be processed by means of an additive manufacturing (AM) process such as Selective Laser Melting (SLM). Furthermore, the processing by means of an energy beam, for example a laser beam, in conjunction with the outward heat conduction conditions in the powder bed allows the formation of a temperature conduction gradient which in turn is advantageous for the optionally desired formation of a fiber-matrix structure in which the individual phases are present as $Mo_{ss}/Mo_5SiB_2/Mo_3Si$ structure.

An optional alloying-in of zirconium (Zr) (0.5 at %-2 at %) leads to an advantageous increase in the fracture toughness of the alloy or of the component.

Furthermore, the AM process offers, compared to the powder-metallurgical process, the advantage that oxygen is very largely kept away from the workpiece. This has a positive effect on the materials properties.

DETAILED DESCRIPTION OF INVENTION

The process data for production by means of the AM process are advantageously:
Alloy: Mo-(x)Si-(y)B,
where x=3-19 at % and y=1-13 at %,
preferably x=13-18 at % and y=8-12 at %,
optional addition of zirconium (Zr) z=0.5 at %-2 at %,
preferably z=1 at %,
Particle size: 10-60 µm, either gas-atomized or milled, as possible processing window:
Scanning speed: 400 mm/s-2000 mm/s,
preferably 1000 mm/s-1500 mm/s,
Laser power: 80 W-250 W,
preferably 100-170 W.

The invention claimed is:

1. An alloy comprising a composition Mo-(x)Si-(y)B-(z)Zr, wherein:
x=13 at % to 18 at %,
y=8 at % to 12 at %, and
z=0.5 at % to 2 at %.

2. An alloy consisting essentially of the composition as claimed in claim 1.

3. The alloy as claimed in claim 1, consisting essentially of Mo, Si, B and Zr and formed by a selective laser melting process such that the alloy comprises a fiber-matrix structure in which individual phases are present as a $Mo_{ss}/Mo_5SiB_2/Mo_3Si$ structure.

4. A component comprising the alloy as claimed in claim 1, wherein the alloy further comprises a fiber-matrix structure formed by an energy beam melting process.

5. A process for producing a component composed of the alloy of claim 1, the process comprising applying powder comprising Mo, Si, B and Zr with a selective energy beam melting process.

6. The process as claimed in claim 5, wherein at least 80%, of particles of the powder have respective sizes in a range from 10 µm to 60 µm.

7. The process as claimed in claim 5, wherein the powder has been gas-atomized or milled.

8. The process as claimed in claim 5, wherein the selective energy beam melting process is controlled to achieve a temperature gradient effective to form a fiber-matrix structure.

9. A component formed by the process of claim 8.

10. The process of claim 8, further comprising controlling the selective energy beam melting process to achieve a temperature gradient effective to form the fiber-matrix structure in which individual phases are present as $Mo_{ss}/Mo_5SiB_2/Mo_3Si$.

11. A component formed by the process of claim 10.

12. The process of claim 8, wherein a scanning speed between the powder and a laser energy beam is between 400 mm/s and 2000 mm/s.

13. The process of claim 12, wherein the scanning speed is between 1000 mm/s and 1500 mm/s.

14. The process of claim 8, wherein the selective energy beam melting process utilizes a laser energy beam power of from 80 W to 250 W.

15. The process of claim 14, wherein the selective energy beam melting process utilizes a laser energy beam power of from 100 W to 170 W.

* * * * *